(12) United States Patent
Misiak et al.

(10) Patent No.: US 8,192,731 B2
(45) Date of Patent: Jun. 5, 2012

(54) THICKENED CYANOACRYLATE COMPOSITIONS

(75) Inventors: Hanns Misiak, Dublin (IE); Rory Barnes, Dublin (IE); Brendan Kneafsey, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 2070 days.

(21) Appl. No.: 11/257,049

(22) Filed: Oct. 25, 2005

(65) Prior Publication Data

US 2007/0092481 A1 Apr. 26, 2007

(51) Int. Cl.
*A61K 31/765* (2006.01)
(52) U.S. Cl. .................................. 424/78.37
(58) Field of Classification Search ............... 424/78.37
See application file for complete search history.

(56) References Cited

U.S. PATENT DOCUMENTS

| | | | |
|---|---|---|---|
| 3,547,851 A | 12/1970 | Frauenglass | |
| 3,742,018 A | 6/1973 | O'Sullivan | |
| 3,846,363 A | 11/1974 | Ando et al. | |
| 4,170,585 A | 10/1979 | Motegi et al. | |
| 4,200,549 A * | 4/1980 | Okamura et al. | 524/722 |
| 4,405,265 A | 9/1983 | Powell et al. | |
| 4,497,916 A | 2/1985 | Cooke et al. | |
| 4,533,422 A | 8/1985 | Litke | |
| 4,556,700 A | 12/1985 | Harris et al. | |
| 4,622,414 A | 11/1986 | McKervey | |
| 4,636,539 A | 1/1987 | Harris et al. | |
| 4,639,475 A | 1/1987 | Dierichs et al. | |
| 4,695,615 A | 9/1987 | Leonard et al. | |
| 4,702,783 A * | 10/1987 | Mason, III | 156/64 |
| 4,718,966 A | 1/1988 | Harris et al. | |
| RE32,889 E | 3/1989 | Litke | |
| 4,837,260 A | 6/1989 | Sato et al. | |
| 4,855,461 A | 8/1989 | Harris | |
| 4,906,317 A | 3/1990 | Liu | |
| 5,312,864 A | 5/1994 | Wenz et al. | |
| 5,371,131 A | 12/1994 | Gierenz et al. | |
| 5,433,775 A | 7/1995 | Gardenier et al. | |
| 6,294,629 B1 | 9/2001 | O'Dwyer et al. | |
| 6,451,927 B1 | 9/2002 | Haas et al. | |
| 6,475,331 B1 | 11/2002 | O'Connor et al. | |
| 2003/0133980 A1 * | 7/2003 | Costantino et al. | 424/468 |
| 2004/0098117 A1 * | 5/2004 | Hossainy et al. | 623/1.42 |
| 2005/0142162 A1 * | 6/2005 | Hunter et al. | 424/423 |

FOREIGN PATENT DOCUMENTS

| | | |
|---|---|---|
| CA | 2 353 605 A1 | 11/1999 |
| DE | 199 57 677 A1 | 6/2000 |
| JP | 51-103939 | 9/1976 |
| JP | 57-135881 A | 8/1982 |
| WO | WO 00/32709 A1 | 6/2000 |
| WO | WO 01/91915 A2 | 12/2001 |

* cited by examiner

*Primary Examiner* — James Rogers
(74) *Attorney, Agent, or Firm* — Steven C. Bauman

(57) ABSTRACT

The present invention relates to thickened cyanoacrylate compositions, such as those in gel or non-flowable forms. More particularly, the present invention relates to non-flowable cyanoacrylate compositions which can be packaged in a convenient pocket-sized applicator dispenser for use in spreading the cyanoacrylate compositions onto substrates.

12 Claims, 1 Drawing Sheet

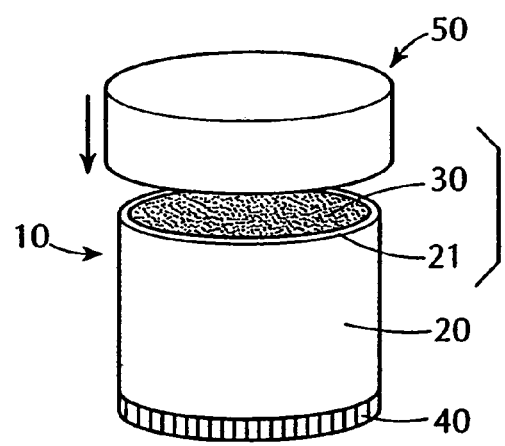
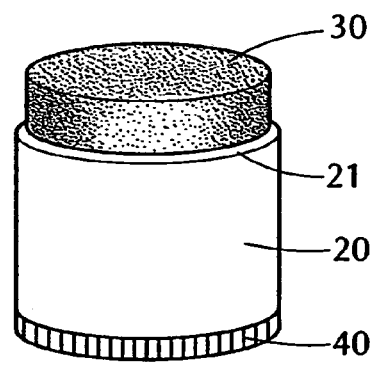
FIG. 1     FIG. 2

THICKENED CYANOACRYLATE COMPOSITIONS

BACKGROUND OF THE INVENTION

1. Field of the Invention

This invention relates to thickened cyanoacrylate compositions.

2. Brief Description of Related Technology

Cyanoacrylate compositions are well known as one component reactive adhesives, which are quick bonding and suitable for applications on variety of substrates.

Because cyanoacrylate compositions are inherently of a low viscosity, some applications, such as those where a substrate having large pores is used, are cumbersome. For that reason, thickened cyanoacrylate compositions were developed. Reported thickeners include acrylate resins, such as poly(methyl(meth)acrylate), polymeric alkylcyanoacrylates, cellulose esters, such as cellulose acetate and cellulose butyrate, and polyvinyl ethers, such as polyvinylmethyl ether. See U.S. Pat. No. 3,742,018.

However, traditional cyanoacrylate compositions have been thickened successfully commercially with only a poly(methylmethacrylate) or poly(vinylacetate), which have been used in higher viscosity versions of cyanoacrylate compositions, such as those available commercially under the LOCTITE tradename, bearing for instance the product numbers 406, 416, 424 or 431. In addition, in terms of cyanoacrylate compositions in gel form thixopropic agents such as fumed silica have been used successfully on a commercial scale, such as with those products commercially under the LOCTITE tradename, bearing for instance the product number 454. See U.S. Pat. No. 4,533,422 and Re. 32,889, and U.S. Pat. No. 4,837,260. The thixotropic, fumed-silica-containing cyanoacrylate compositions are described as being in the form of a nonflowable gel which will not substantially move when placed on a substrate. These cyanoacrylate compositions may also contain thickeners, such as for the purpose of preventing the fumed silica from settling in the composition. Disclosed thickeners include poly(meth)acrylates, polycyanoacrylates, and poly(vinyl)acetates.

It is well known to formulate adhesives in the form "stick" compositions. The patent literature on adhesives in "stick" form is extensive and covers a broad range of adhesive types, describing for instance emulsion adhesives, solvent based adhesives, and contact adhesives. In addition, gelling and solidifying additives for the preparation of such stick adhesives report the use of natural polymers and inert fillers. An example of one such adhesive stick is sold under the tradename PRITT STICK by Henkel KGaA. This is an emulsion-based adhesive.

A number of patent documents identify adhesive compositions that have been formulated as soft-solids, and in some cases sticks. For instance, U.S. Pat. No. 5,433,775 discloses an adhesive stick consisting of a water-based preparation of starch derivatives and a soap gel as the shaping gel-forming component. See also U.S. Pat. No. 5,371,131.

U.S. Pat. No. 3,846,363 relates to an adhesive crayon composition containing a sorbitol-benzaldehyde reaction product as an additive. U.S. Pat. No. 4,639,475 discloses an adhesive stick composed of the reaction product of sorbitol and/or xylitol and benzaldehyde as the gel-forming composition together with an adhesive resin which is the reaction product of methyl vinyl ether/maleic acid anhydride copolymers with partially neutralized acid phosphate esters of non-ionic wetting agents of the lower alkylene oxide adduct type. Room temperature dimensionally stable cyanoacrylate compositions have also been prepared with condensation products of aldehydes and ketones with polyols, such as dibenzylidene sorbital. See International Patent Publication Nos. WO 00/32709 and WO 01/91915, and Canadian Patent Application No. CA 2,353,605.

Japanese Patent Document No. 51-103,939 describes a stick-like epoxy adhesive and a stick-like epoxy hardening agent which is used therewith. The sticks in JP '939 patent document seem to be obtained by compounding a gelling agent and/or water and/or organic solvent with a liquid or solution type epoxy adhesive and an epoxy hardening agent.

German Patent Document No. DE 199 57 677 A1 describes a cyanoacrylate adhesive, coating or sealing material, which also contains at least one condensation product of an aldehyde or ketone with a polyol. The adhesive may be in stick form.

U.S. Pat. No. 4,497,916 discloses a continuous liquid phase non-cyanoacrylate adhesive composition to which is added solid wax-like particles dispersed therein. These particles may be chosen from polyethylene glycol materials having 4,000 to 20,000 molecular weight, stearic acid, acid waxes or stearic esters. The compositions disclosed in the '916 patent are formed by heating this combination of materials in slurry form and applying it, while heated, to threads. The composition then cools to obtain a non-mobile coating. This composition requires substantial preparation in order to obtain the composition and apply it on parts. U.S. Pat. No. 3,547,851 discloses anaerobic compositions, which have been rendered non-flowable through the inclusion of various waxes.

U.S. Pat. No. 6,451,927 describes a non-flowable poly(meth)acrylate adhesive composition having a polymeric matrix in sufficient quantity where it is non-flowable at temperatures up to 180° F. (82° C.) while being dispensable at room temperature without the application of heat.

Recently, Henkel Corporation introduced a line of adhesive products in the form of a stick. For instance, LOCTITE QUICK STIK 248, 268, 668, 548, 536 and PST 561 are members of that product line. However, conspicuously absent from this product line is one based on cyanoacrylates. One reason for this is that cyanoacrylates are notoriously sensitive to premature polymerization or destabilization, which is because of the cure profile or physical characteristics of the cyanoacrylate.

Accordingly, it would be desirable to provide a thickening agent for use as a constituent in cyanoacrylates that can be used in a variety of concentrations without adversely affecting the shelf life of the cyanoacrylate while having a dramatic impact on the viscosity, permitting the formulation of cyanoacrylates in a variety of viscosities up to and including a non-flowable form at room temperature.

SUMMARY OF THE INVENTION

The present invention is directed to a thickened cyanoacrylate composition which includes, beyond the cyanoacrylate component, a polymer component, such as one constructed from poly(ethylene glycol) and poly(butylene terephthlate) segments. A particularly desirable polymer component for use herein is poly[butyleneterephthalate-co-poly(ethyleneglycol)terephthalate]. The addition of this polymer component allows for the formulation of cyanoacrylate compositions in the form of low viscosity emulsions, gels and non-flowable forms, depending on the nature and level of the polymer material used in the composition.

In another aspect, the present invention is directed to a method of bonding two or more substrates including the steps of providing at least two substrates; applying, onto at least a portion of a surface of one or both of the at least two substrates, a cyanoacrylate composition as noted above; contacting the surfaces of the at least two substrates having the cyanoacrylate composition there between; and curing the cyanoacrylate composition.

In still another aspect, the present invention is directed to a bonded assembly including: a first substrate having a first surface; another substrate having a second surface; and a cured cyanoacrylate composition disposed between the first and second surfaces, the composition having included prior to cure: a cyanoacrylate component and the polymer component as noted above.

In yet another aspect, the present invention is directed to a method of preparing the cyanoacrylate composition as noted above.

In a further aspect, the present invention is directed to an article of manufacture. In this aspect, there is included a dispensing container for housing and dispensing a non-flowable adhesive composition. The container includes a generally elongate hollow body having first and second ends, with one of the ends having a dispense opening. The container houses the room-temperature-flowable polymerizable cyanoacrylate composition as noted above.

BRIEF DESCRIPTION OF THE DRAWINGS

FIG. 1 is a perspective view of a lipstick-type dispenser container with a dispenser cap.

FIG. 2 is a perspective view of a lipstick-type dispenser container showing a non-flowable cyanoacrylate composition contained therein.

DETAILED DESCRIPTION OF THE INVENTION

The present invention is directed to a thickened cyanoacrylate composition, which includes, beyond the cyanoacrylate component, a polymer material.

The cyanoacrylate component includes at least one α-cyanoacrylate monomer of the formula:

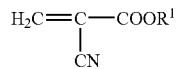

where $R^1$ represents a straight chain or branched chain alkyl group having 1 to 12 carbon atoms (which may be substituted with a substituent such as a halogen atom or an alkoxy group), a straight chain or branched chain alkenyl group having 2 to 12 carbon atoms, a straight chain or branched chain alkynyl group having 2 to 12 carbon atoms, a cycloalkyl group, an aralkyl group or any aryl group. Specific examples of $R^1$ are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-choroethyl group, a 3-choropropyl group, a 2-chorobutyl group, a trifluoroethyl group, a 2-methoxyethyl group, a 3-methoxybutyl group and a 2-ethoxyethyl group. Ethyl cyanoacrylate is a particularly desirable choice for use in the inventive compositions.

A single α-cyanoacrylate monomer or a mixture of two or more of these α-cyanoacrylate monomers can be used. Generally, the above α-cyanoacrylate monomer used alone as an adhesive, and one or more components such as those set forth below, are used to formulate a commercial composition. The additional components includes, but are not limited to, accelerators; anionic polymerization inhibitors; radical polymerization inhibitors; additives, such as plasticizers, heat stabilizers and toughening agents; and/or perfumes, dyes, and pigments.

A suitable amount of α-cyanoacrylate monomer present in the inventive compositions is from about 50 to 99.5% by weight, such as 60 to 90% by weight, desirable 75% by weight, based on the total weight of the composition.

The polymer material may be one constructed from poly (ethylene glycol) and poly(butylene terephthlate) sections. For instance, one commercially available example of such a material is sold by Octoplus, Netherlands under the tradename PolyActive. PolyActive-brand products are described as biodegradable polymer-based drug delivery systems. PolyActive-brand products represent a series of poly(ether ester) and multiblock copolymers based on poly(ethylene glycol), PEG, and poly(butylene terephthalate), PBT. The amount and length of each of the two building blocks is reported to create a diverse family of polymers with physical properties such as rate of controlled release, degradation, swelling and strength that can be precisely controlled by the appropriate combination of the two copolymer segments. The disclosure of PolyActive-brand products may be shown as

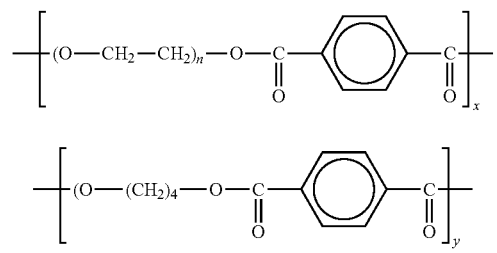

OctoPlus has reported that due to the presence of hydrophilic poly(ethylene glycol) segments, PolyActive-brand products exhibit a hydrogel character.

The polymer material should be used in the present invention in amounts of about 0.5% to about 30%, for instance about 2.5% to about 20%, such as about 5% to about 15%, by weight based on the total weight of the composition. When present in these amounts, the increased viscosity, gel and non-flowability characteristics of a composition can be obtained. Additionally, these materials can be added directly in solid form, such as in powder or particulate form, without pre-melting or even heating of the polymeric material.

An anionic polymerization inhibitor is generally added to α-cyanoacrylate compositions in an amount from about 0.0001 to 10% by weight based on the total weight of the composition, to increase the stability of the composition during storage. Examples of useful inhibitors include sulfur dioxide, sulfur trioxide, nitric oxide, hydrogen fluoride, organic sultone inhibitors, boron trifluoride and methane sulfonic acid, aromatic sulfonic acids, aliphatic sulfonic acids, and sulfones. The amount of inhibitor will suitably be any convenient amount in order to slow down cure of the composition. Desirably, inhibitors of anionic polymerization are present at about 0.0001% to about 0.1% by weight based on the total weight of the composition.

A radical polymerization inhibitor is generally added to α-cyanoacrylate compositions as well, in an amount from about 0.001 to 2.0%, particularly 0.03 to 0.5%, based on the total weight of the composition, for the purpose of capturing radicals which are formed by light during storage. Such inhibitors are ordinarily of the phenolic type include, for example, hydroquinone and hydroquinone monomethyl ether. Other inhibitors suitable for use herein include butylated hydroxytoluene and butylated hydroxyanisole.

A thickener may be added to increase the viscosity of the α-cyanoacrylate composition; however, with the recited polymeric material, it may not be as desirable. Nevertheless, various polymers can be used as thickeners, and examples include poly(methyl methacrylate), methacrylate-type copolymers, acrylic rubbers, cellulose derivatives, polyvinyl acetate and poly(α-cyanoacrylate). A suitable amount of thickener is generally about 0.01 to 30% by weight, preferably 5.0 to 25% by weight based on the total weight of the cyanoacrylate adhesive composition.

Phthalic anhydride and other plasticizers may also be added to the cyanoacrylate component to further aid in durability and impact, heat, and moisture resistance. The plasticizer is preferably present in an amount of about 0.005% to about 5.0%, more preferably about 0.01% to about 2.0% by weight based on the total weight of the composition.

Perfumes, dyes, pigments, and the like may be added to the inventive composition depending on use purposes in amounts which do not adversely affect the stability of the α-cyanoacrylate monomer. The use of such additives is within the skill of those practicing in the cyanoacrylate adhesive art and need not be detailed herein.

Accelerators that may be useful in the cyanoacrylate compositions include for example calixarenes, oxacalixarenes, and combinations thereof. Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

Another potentially useful accelerator component is a crown ether. A host of crown ethers are known. For instance, examples which may be used herein either individually or in combination, or in combination with the calixarenes and oxacalixarenes described above include 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Other suitable accelerators include those described in U.S. Pat. No. 5,312,864 (Wenz), which are hydroxyl group derivatives of an α-, β- or γ-cyclodextrin which is at least partly soluble in the cyanoacrylate; in U.S. Pat. No. 4,906,317 (Liu), which are silacrown compounds to accelerate fixturing and cure on de-activating substrates such as wood, examples of which are within the following structure:

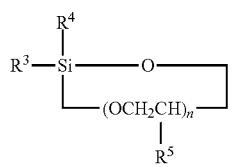

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups such as methoxy, and aryloxy groups such as phenoxy. The $R^3$ and $R^4$ groups may contain halogen or other substituents, an example being trifluoropropyl. However, groups not suitable as $R^4$ and $R^5$ groups are basic groups such as amino, substituted amino and alkylamino.

Specific examples of silacrown compounds useful in the inventive compositions include:

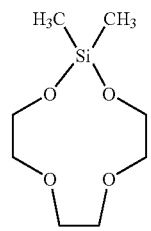

dimethylsila-11-crown-4;

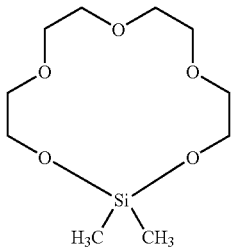

dimethylsila-14-crown-5; and

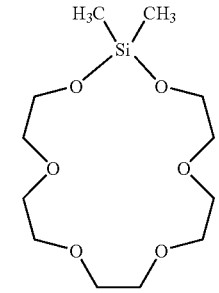

dimethylsila-17-crown-6.

The accelerator component should be included in the compositions in an amount within the range of from about 0.1% to about 10%, with the range of about 0.5% to about 5% being desirable, and about 0.1% to about 1% by weight based on the total weight of the composition being particularly desirable.

See e.g. U.S. Pat. Nos. 4,170,585; 4,450,265; 6,294,629; and 6,475,331, the contents of which are all incorporated herein by reference.

Preparation of the compositions and products of the present invention can be achieved by mixing the polymer material into the cyanoacrylate composition at elevated temperature. Desirably, these constituents are mixed at about 1000 rpm under elevated temperature conditions, for example, 80° C. to 140° C. The polymer material may then be added, while maintaining the temperature at about 80° C. to 140° C. Or, the polymer material may be preheated to the above-described temperatures before its addition. The actual temperature used may vary depending upon the melting point or the solubility in a cyanoacrylate of the polymer material. The so-formed composition may then be dispensed into a dispensing container, such as a lipstick-type dispenser, while hot. The dispensers are then allowed to cool to create the composition of the present invention.

Mixing is performed for a time sufficient to disperse or dissolve the polymer material into the cyanoacrylate composition, which can vary depending on the batch size. Generally, only seconds or minutes are required to achieve the desired blending in of the polymer material. The composition will thus become thickened upon returning to room temperature.

Reference to FIGS. 1-2 shows the dispenser to be typically in a generally elongate shape and designed to mechanically advance the composition through a dispense opening. The dispense opening can be defined as the entire perimeter of the container wall or it can be smaller apertures such as slots or holes located on the end surface of the container. Alternatively, the dispense opening can extend away from the container wall, narrowing or telescoping as it so extends to form a dispense opening with an internal diameter less then that of the container wall itself. It may be desirable to have the narrowed dispense end include at the distal end thereof a flow through applicator or brush for more precise application. A portion of the dispense end of the container can be concave to accommodate a threaded member or tubular body which requires application of the composition. And since the cyanoacrylate adhesive composition is in a non-flowable form, the mechanic or maintenance worker can readily carry it without fear of spillage.

The container is generally fitted with a cap, which fits over and around the container walls.

At the container end opposite the dispense opening, i.e., the bottom end of the container is proximally located a mechanism for mechanically advancing the adhesive. These mechanisms are generally well known in the art and include a pusher means which can include a knob located at the bottom of the container which when turned in one direction advances the composition contained therein to the dispense opening and when turned in the other direction moves the composition in the opposite direction. This mechanism for mechanically advancing the cyanoacrylate adhesive composition creates a friction on the non-flowable cyanoacrylate compositions, which friction renders the composition free flowable while it is applied.

More specifically, reference to FIGS. 1-2 depicts an article of manufacture in more particular detail. FIG. 1 shows container 10 having a generally elongate tubular shape defined by wall 20 and having a dispense end defined by perimeter 21. Cap 50 as shown is designed for closely engaging tubular wall 20 by fitting thereover. Desirably, cap 50 engages the tubular wall 20 to provide a barrier against ambient humidity to prevent premature curing of the cyanoacrylate adhesive composition disposed within container 10. Composition 30 is shown in FIG. 1 within container 10. FIG. 2 shows composition 30 being advanced above perimeter 21 using knurled knob 40 which was turned to mechanically advance the composition within container 10. In one embodiment, knob 40 may be turned in the opposition direction to cause composition 30 to descend back within container 10.

The container 10 (or for that matter alternative designs thereof) may be constructed from a material to which cyanoacrylate materials do not stick, like poyolefins, e.g., polyethylene, polypropylene, or polymethylpentene. Desirably, materials that have a low penetrability to gases and moisture should be used, in order to ensure good shelf life of the cyanoacrylate. Thus, high density polyethylene (HDPE), or co-extruded multi layer materials (e.g., inner layer polyethylene, outer layer a gas barrier plastic) may be used, examples of such gas barrier plastics include polyvinylidenechloride, co-polymers of vinylidenechloride, polycarbonate, co-polymers of vinylacohol and ethyleneglycol). In addition, metal containers with laquered inner surfaces may be used.

The cyanoacrylate compositions of the present invention are useful in bonding two or more substrates. A sufficient portion of the composition may be placed on a surface of one of the two or more substrates. The other substrate is then positioned adjacent to the cyanoacrylate composition and the two substrates are placed in contact to form an assembly, upon curing of the cyanoacrylate.

The following non-limiting examples are intended to further illustrate the present invention.

EXAMPLES

Cyanoacrylate compositions labeled Sample Nos. 1-6 were prepared by incorporating the amount indicated in Table 1 of poly[butyleneterephthalate-co-poly(alkyleneglycol) terephthalate], available commercially from Aldrich Chemical Co., and mixing for about 10 minutes at about 120° C., until the polymer material dissolved in the cyanoacrylate composition.

TABLE 1

| | Sample No./Amt. (wt %) | | | | | |
|---|---|---|---|---|---|---|
| Component | 1 | 2 | 3 | 4 | 5 | 6 |
| Ethyl cyanoacrylate monomer | Bal. | Bal. | Bal. | Bal. | Bal. | — |
| n-Butyl cyanoacrylate monomer | — | — | — | — | — | Bal. |
| Polymer Material | 1 | 2.5 | 5 | 10 | 15 | 10 |

Table 2 shows the visual observation of gel formation and aspect of Sample Nos. 1-6.

TABLE 2

| Sample No. | Gel Formation | Aspect |
|---|---|---|
| 1 | No | semitransparent emulsion |
| 2 | Yes | semitransparent |
| 3 | Yes | opaque |
| 4 | Yes | opaque |
| 5 | Yes | opaque |
| 6 | Yes | colorless |

An inventive composition in stick form was prepared from 6.25% by weight polymer material in ethyl cyanoacrylate. Once mixed, the composition was cast into an empty container, and after returning to room temperature, the composition solidified into what appeared to be a non-flowable mass.

The so-formed composition in non-flowable form was used by application first onto paper in the same way as a conventional PRITT STICK-brand adhesive stick would. Within 10 seconds, a resulting fixture formed. The so-formed composition was also used on black acrylonitrile-butadiene-styrene-terpolymer plastic, and resulted in a fixture time of 8 seconds.

What is claimed is:

1. A cyanoacrylate composition having a shelf life consisting essentially of:
   a. at least one α-cyanoacrylate monomer; and
   b. a polymer material constructed from poly(ethylene glycol) and poly(butylene terephthalate) sections; and
   c. optionally, anionic polymerizable inhibitors, radical polymerization inhibitors, thickeners, perfumes, dyes, pigments, accelerators, and combinations thereof.

2. The composition of claim 1, wherein said polymer material is present in an amount sufficient to thicken said composition.

3. The composition of claim 1, wherein said polymer material is present in an amount sufficient to render said composition in gel form.

4. The composition of claim 1, wherein said polymer material is present in an amount sufficient to render said composition non-flowable at room temperature.

5. The composition of claim 4, wherein said composition is dispensable at room temperature without application of heat.

6. The composition of claim 1, wherein the α-cyanoacrylate monomer is represented by compounds of the formula:

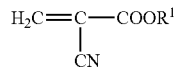

wherein $R^1$ represents a straight chain or branched chain substituted or unsubstituted alkyl group having 1 to 12 carbon atoms, a straight chain or branched chain substituted or unsubstituted alkenyl group having 2 to 12 carbon atoms, a straight chain or branched chain substituted or unsubstituted alkynyl group having 2 to 12 carbon atoms, a substituted or unsubstituted cycloalkyl group, a substituted or unsubstituted aralkyl group or a substituted or unsubstituted aryl group.

7. The composition of claim 6, wherein $R^1$ is selected from the group consisting of a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-choroethyl group, a 3-choropropyl group, a 2-chorobutyl group, a trifluoroethyl group, 2-methoxyethyl group, a 3-methoxybutyl group, a 2-ethoxyethyl group and combinations thereof.

8. The composition of claim 1, wherein said α-cyanoacrylate monomer is an ethyl cyanoacrylate monomer.

9. The composition of claim 1, wherein said α-cyanoacrylate monomer is present up to about 98% by weight of the total composition.

10. The composition of claim 1, wherein the polymer material is present in amounts of about 0.5% to about 30% by weight of the composition.

11. The composition of claim 1, wherein the polymer material is poly[butyleneterephthalate-co-poly(alkyleneglycol)terephthalate].

12. An article of manufacture comprising:
   a. a dispensing container for housing and dispensing a non-flowable adhesive composition, said container comprising a generally elongate hollow body having first and second ends, with one of said ends defining a dispense opening; and
   b. a cyanoacrylate composition having a shelf life within said container, said composition comprising:
      (i) at least one cyanoacrylate monomer; and
      (ii) a polymer material constructed from poly(ethylene glycol) and poly(butylene terephthlate) sections.

* * * * *